(12) United States Patent
Shen

(10) Patent No.: US 9,663,040 B1
(45) Date of Patent: May 30, 2017

(54) FASTENING STRUCTURE FOR BICYCLE RACK

(71) Applicant: KING ROOF INDUSTRIAL CO., LTD., Taichung (TW)

(72) Inventor: Shih-Chieh Shen, Taichung (TW)

(73) Assignee: KING ROOF INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/094,057

(22) Filed: Apr. 8, 2016

(51) Int. Cl.
*B60R 9/10* (2006.01)
*B60D 1/52* (2006.01)
*B60R 9/06* (2006.01)

(52) U.S. Cl.
CPC ............... *B60R 9/10* (2013.01); *B60R 9/06* (2013.01); *B60D 1/52* (2013.01)

(58) Field of Classification Search
CPC .................................... B60R 9/10; B60D 1/52
USPC ................................ 224/519; 280/504, 506
See application file for complete search history.

(56) References Cited

U.S. PATENT DOCUMENTS

| | | | | |
|---|---|---|---|---|
| 5,690,260 A * | 11/1997 | Aikins | ...................... | B60R 9/10 224/504 |
| 6,974,147 B1 * | 12/2005 | Kolda | ...................... | B60D 1/52 280/506 |
| 7,004,491 B1 * | 2/2006 | Allsop | ...................... | B60D 1/52 280/491.2 |
| 7,448,640 B2 * | 11/2008 | Weaver | ...................... | B60D 1/06 280/506 |
| 7,717,455 B2 * | 5/2010 | Morris | ...................... | B60D 1/07 280/491.5 |
| 7,802,807 B2 * | 9/2010 | Blakley | ...................... | B60D 1/52 280/495 |
| 8,141,760 B2 * | 3/2012 | Kuschmeader | ........... | B60R 9/06 224/497 |
| 8,308,185 B2 * | 11/2012 | Weaver | ................... | B60D 1/025 280/506 |
| 8,596,664 B2 * | 12/2013 | Lahn | ........................ | B60D 1/06 280/495 |
| 8,696,011 B2 * | 4/2014 | Despres | ................... | B60D 1/06 280/478.1 |
| 8,944,516 B2 * | 2/2015 | Eidsmore | .................. | B60P 1/28 280/506 |

(Continued)

FOREIGN PATENT DOCUMENTS

TW           M473345           3/2014

*Primary Examiner* — Justin Larson
(74) *Attorney, Agent, or Firm* — Muncy, Geissler, Olds & Lowe, P.C.

(57) ABSTRACT

A fastening structure for bicycle rack includes a connection rod, a slidable member, an adjusting member and an abutting block. The connection rod is inserted into an assembling rod of an automobile. First, second and third directions are defined to be perpendicular to one another, and the connection rod includes a restriction hole along the third direction. The slidable member is slidably arranged in the connection rod and has a first abutted portion. The adjusting member is disposed through the assembling rod and the connection rod along the second direction, assembled to the slidable member in the connection rod, and slidable between first and second positions along the second direction. The abutting block is arranged in the connection rod and has an abutting portion and a second abutted portion, and the first abutted portion abuts against the second abutted portion.

9 Claims, 7 Drawing Sheets

(56) References Cited

U.S. PATENT DOCUMENTS

| | | | |
|---|---|---|---|
| 9,027,950 B2* | 5/2015 | Lahn | B60D 1/06 280/506 |
| 2006/0208456 A1* | 9/2006 | Weaver | B60D 1/06 280/491.5 |
| 2011/0089669 A1* | 4/2011 | Despres | B60D 1/06 280/478.1 |
| 2014/0084568 A1* | 3/2014 | Lahn | B60D 1/06 280/506 |

* cited by examiner

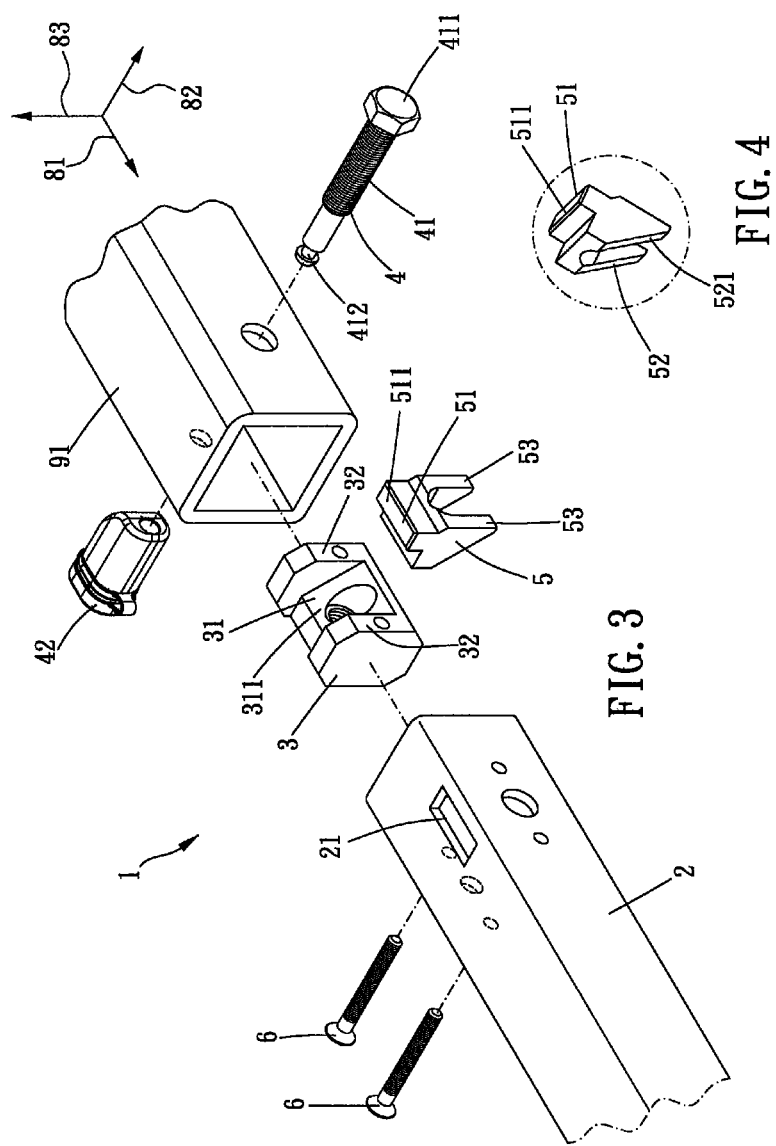

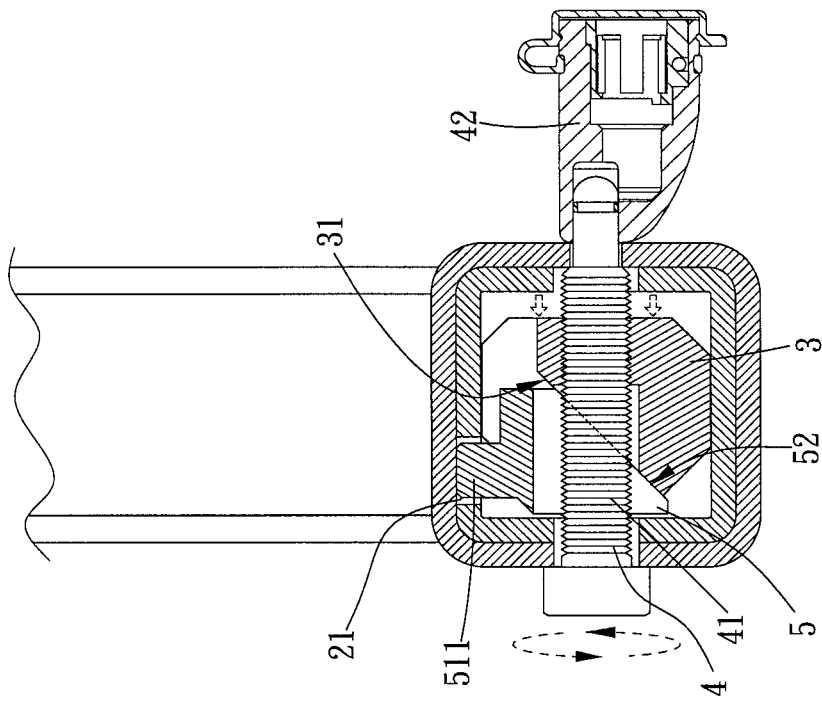
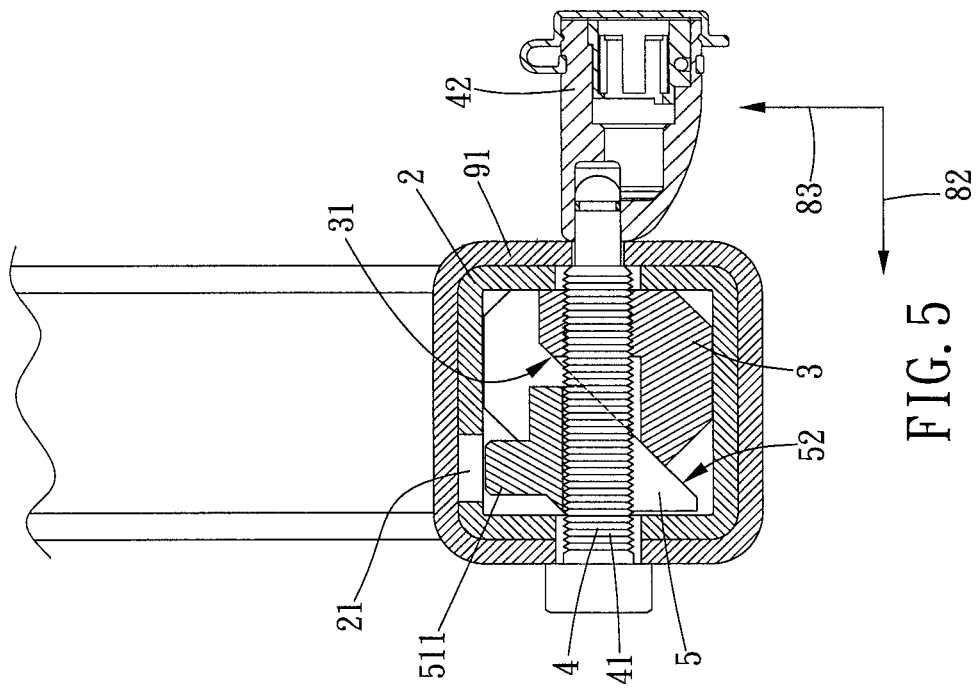

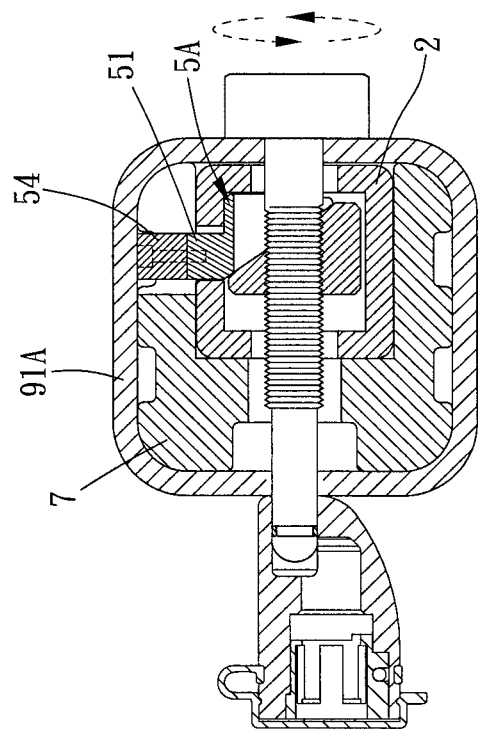
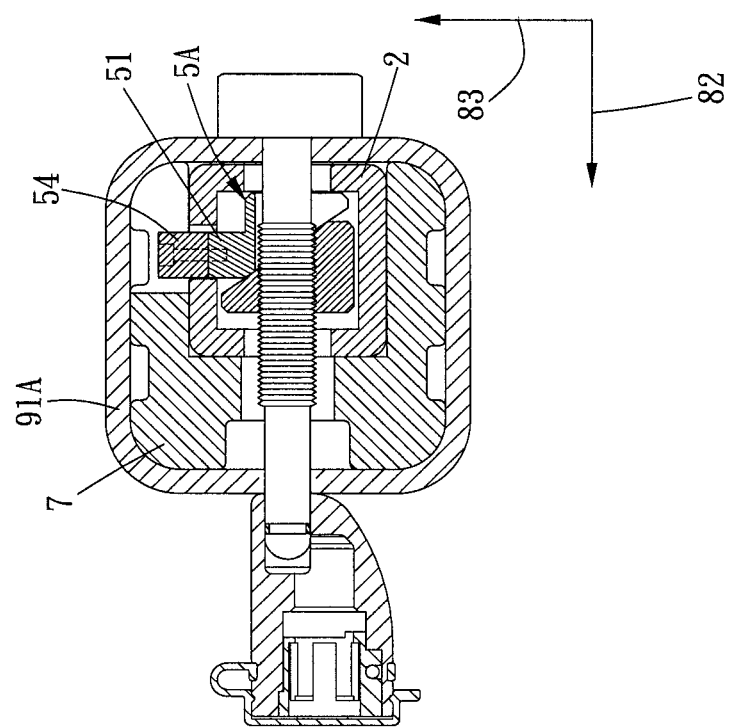
FIG. 11
FIG. 10

FASTENING STRUCTURE FOR BICYCLE RACK

BACKGROUND OF THE INVENTION

Field of the Invention

The present invention relates to a fastening structure, and more particularly to a fastening structure for bicycle rack.

Description of the Prior Art

People nowadays like to conduct outdoor activities to relax on weekends. For carrying a bicycle conveniently when going out, people puts the bicycle on a bicycle rack to connect the bicycle rack with a body of an automobile. The body of the automobile has an assembling rod, the bicycle rack has a connecting rod, the connecting rod is inserted into the assembling rod, and an adjusting member (a pin) is disposed through and fix the connecting rod and the assembling rod so as to prevent the connecting rod and the assembling rod from being disassembled from each other. This type of bicycle rack structure is disclosed in TWM473345.

However, in this type of convention bicycle rack structure, there is a gap between the connecting rod and the assembling rod and cannot be assembled with each other stably; therefore, when a user is driving the automobile, the adjusting member and the connecting rod shakes, the adjusting member may squeeze with the connecting rod and the assembling rod, and following problems may happen: the adjusting member bends, a thread of the adjusting member is abraded and a through hole of the connecting rod deforms. If the adjusting member and the connecting rod are not connected to each other tightly, the adjusting member cannot be disassembled smoothly, or the adjusting member may fall off and cause the bicycle rack to be disassembled from the body of the automobile.

The present invention has arisen to mitigate and/or obviate the afore-described disadvantages.

SUMMARY OF THE INVENTION

The major object of the present invention is to provide a fastening structure for bicycle rack wherein an adjusting member can be stably inserted between a connection rod and an assembling rod to prevent the adjusting member from loosening, and the connection rod and the assembling rod are assembled to each other more stably.

To achieve the above and other objects, a fastening structure for bicycle rack is provided for being connected and fastened to an assembling rod of an automobile, including a connection rod, a slidable member, an adjusting member and an abutting block. The connection rod is inserted into the assembling rod of the automobile, the connection rod defines a first direction along a longitudinal direction, defines a second direction perpendicular to the first direction, further defines a third direction perpendicular to the first and second directions, and the connection rod includes a restriction hole along the third direction. The slidable member is slidably arranged in the connection rod, and the slidable member has a first abutted portion. The adjusting member is disposed through the assembling rod of the automobile and the connection rod along the second direction, the adjusting member is assembled to the slidable member in the connection rod, the slidable member is slidable between a first position and a second position along the second direction. The abutting block is arranged in the connection rod, the abutting block has an abutting portion and a second abutted portion, and the first abutted portion abuts against the second abutted portion, when the adjusting member is driven, the adjusting member drives the slidable member to slide from the first position toward the second position, the first abutted portion pushes the second abutted portion, the abutting block is forced to move along the third direction to penetrate through the restriction hole and abut against an inner wall of the assembling rod so as to fill a gap on the third direction which is produce by the connection rod inserted into the assembling rod of the automobile.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 3 is a breakdown view of the preferred embodiment of the present invention;

FIG. 4 is a partially-enlarged view of the preferred embodiment of the present invention;

FIGS. 5 and 6 are drawings showing the preferred embodiment of the present invention in operation;

FIGS. 10 and 11 are drawings showing another preferred embodiment of the present invention in operation.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figures 1, 2:
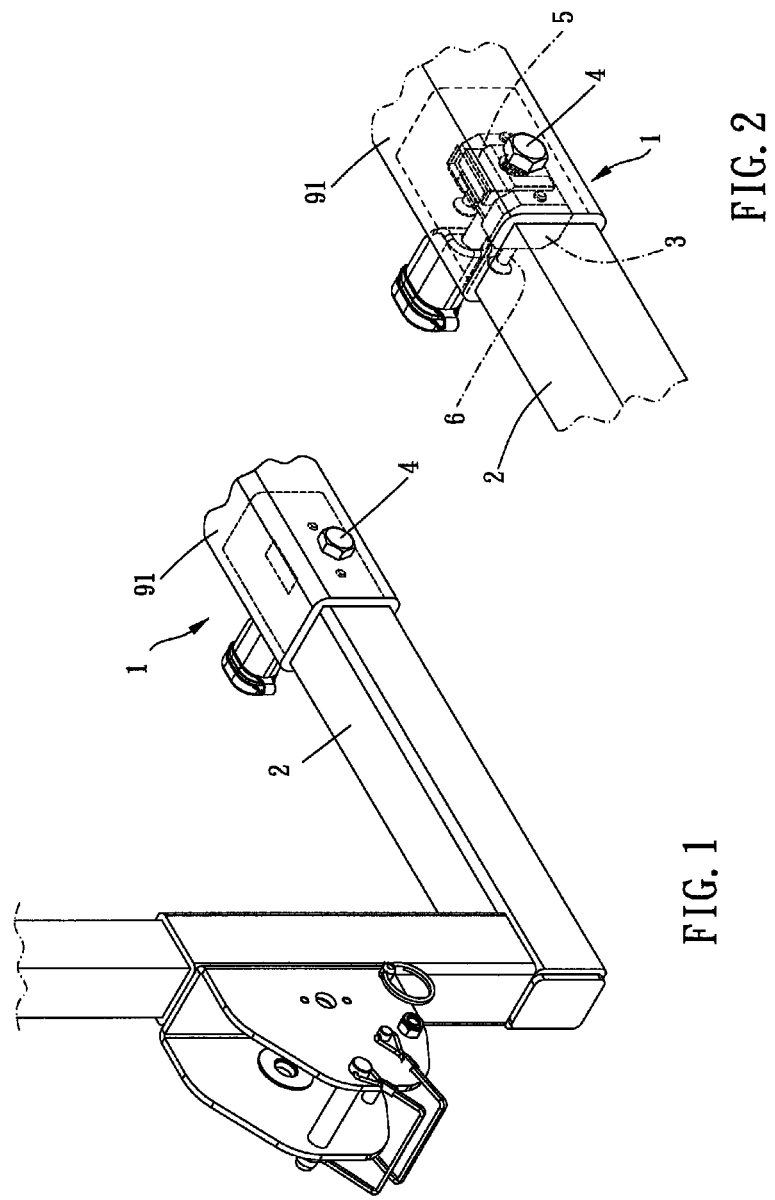
FIG. 1 is a perspective view of a preferred embodiment of the present invention.
FIG. 2 is a drawing showing the preferred embodiment of the present invention.
Figure 7:
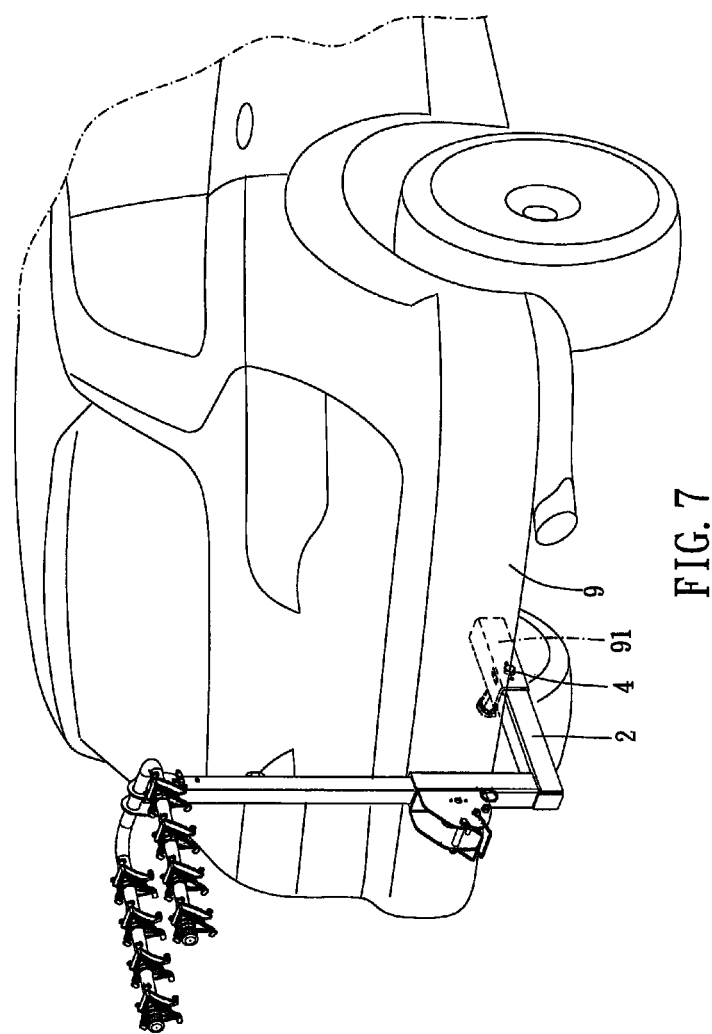
FIG. 7 is a drawing showing an assembly of the preferred embodiment of the present invention.

Please refer to FIGS. 1 to 7 for a preferred embodiment of the present invention. A fastening structure 1 for bicycle rack is for being connected and fastened to an assembling rod 91 of an automobile 9, including a connection rod 2, a slidable member 3, an adjusting member 4 and an abutting block 5.

The connection rod 2 is inserted in the assembling rod 91 of the automobile 9, the connection rod 2 defines a first direction 81 along a longitudinal direction (as shown in FIG. 3), defines a second direction 82 perpendicular to the first direction 81, and further defines a third direction 83 perpendicular to the first direction 81 and the second direction 82. The connection rod 2 includes a restriction hole 21 along the third direction 83.

The slidable member 3 is slidably arranged in the connection rod 2, and the slidable member 3 has a first abutted portion 31.

The adjusting member 4 is disposed through the assembling rod 91 of the automobile 9 and the connection rod 2 along the second direction 82, the adjusting member 4 is assembled to the slidable member 3 in the connection rod 2, and the slidable member 3 is slidable between a first position and a second position along the second direction 82.

The abutting block 5 is arranged in the connection rod 2, the abutting block 5 has an abutting portion 51 and a second abutted portion 52, and the first abutted portion 31 abuts against the second abutted portion 52.

when the adjusting member 4 is driven, the adjusting member 4 drives the slidable member 3 to slide from the first position toward the second position, the first abutted portion 31 pushes the second abutted portion 52, the abutting block 5 is forced to move along the third direction 83 to penetrate through the restriction hole 21 and abut against an inner wall of the assembling rod 91 so as to eliminate a gap on the third direction 83 which is produced by the connection rod 2 inserted into the assembling rod 91 of the automobile 9. Therefore, the adjusting member 4 can not only fix the slidable member 3 to the connection rod 2 on the second direction 82 but also make the abutting block 5 abut against the assembling rod 91 of the automobile 9 on the third direction 83, and the connection rod 2 and the assembling rod 91 abut against each other tightly in two directions; therefore, the connection rod 2 and the assembling rod 91 can be prevented from shaking, the adjusting member 4 can be prevented from loosening off and being disassembled from the connection rod 2, and the connection rod 2 and the assembling rod 91 can be prevented from disassembled from each other. In this embodiment, the abutting portion 51 is a protrusion 511 extending from the abutting block 5, the restriction hole 21 corresponds to the protrusion 511 in shape (in this embodiment, the restriction hole 21 is rectangular) so that when the protrusion 511 is disposed through the restriction hole 21, the abutting block 5 is unmovable along the first direction 81 and the second direction 82.

Specifically, preferable, the adjusting member 4 is a threaded rod 41, the threaded rod 41 is rotatable relative to the connection rod 2 and the assembling rod 91, and the threaded rod 41 is screwed with the slidable member 3. When the threaded rod 41 is rotated, the slidable member 3 is slidable relative to the threaded rod 41 along the second direction 82. In this embodiment, an end of the threaded rod 41 is a head portion 411, the other end of the threaded rod 41 radially includes a annular groove 412, a lock member 42 is engaged with the annular groove 412, and the threaded rod 41 is rotatably positioned in the connection rod 42 through the head portion 411 of the threaded rod 41 and the lock member 42.

The fastening structure 1 for bicycle rack further includes at least one guiding rod 6, the at least one guiding rod 6 is disposed the connection rod 2 along the second direction 82 to be arranged within the slidable member 3 so that the slidable member 3 is restricted in the connection rod 2 and that the slidable member 3 is slidable relative to the adjusting member 4 and unrotatable, and the slidable member 3 can be prevented from moving freely and falling out of the connection rod 2 after the adjusting member 4 is disassembled.

Preferably, at least one of the first and second abutted portions 31, 52 is a slant face inclined toward the third direction 83. In this embodiment, the first abutted portion 31 is a first slant face 311 inclined toward the third direction 83 so as to push the abutting block 5 toward the third direction effectively to penetrate through the restriction hole 21 and abut against an inner wall of the assembling rod 91. In this embodiment, the fastening structure 1 includes two said guiding rods 6, each of two ends of the slidable member 3 on the first direction 81 includes a first side wall 32, the first slant face 311 is located between the two first side walls 32, and the two guiding rods 6 are respectively disposed through the two first side walls 32.

Specifically, in this embodiment, the abutting block 5 is received in the two first side walls 32, each of two ends of the abutting block 5 on the first direction 81 includes a second side wall 53, and the two second side walls 53 form the second abutted portion 521. The second abutted portion 52 are a second slant face 521 inclined toward the third direction 83. Through the first slant face 311 and the second slant face 521 abutting against each other, the slidable member 3 can push the abutting block 5 to move along the third direction 83 more effectively. As viewed along the second direction 82, the abutting block 5 is reversed U-shaped. The abutting block 5 is saddled on the adjusting member 4 which is located between the two second side walls 53.

Figure 8:
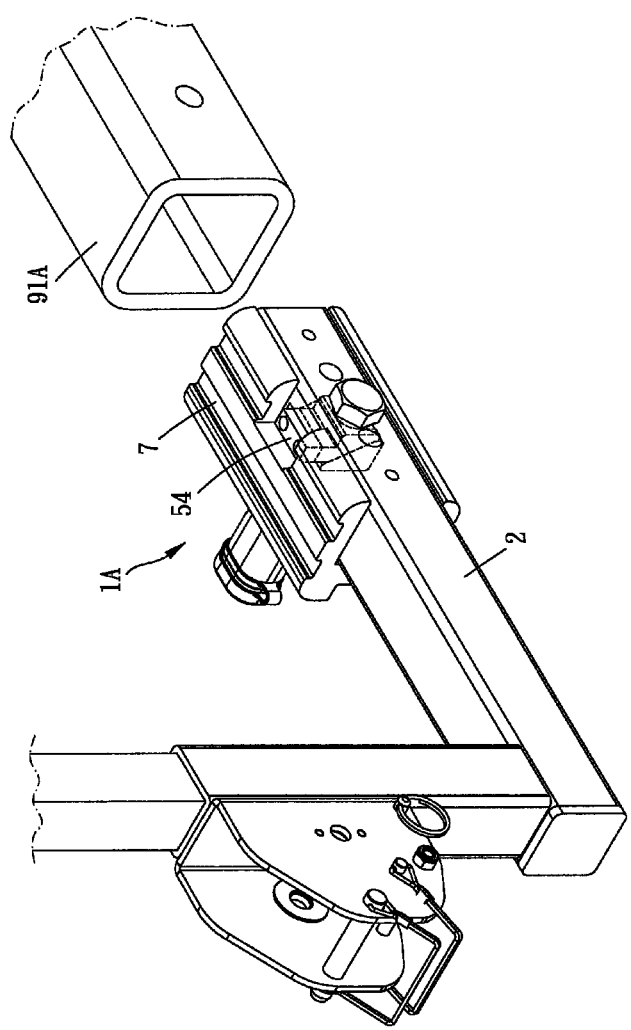
FIG. 8 is a perspective view of another preferred embodiment of the present invention.
Figure 9:
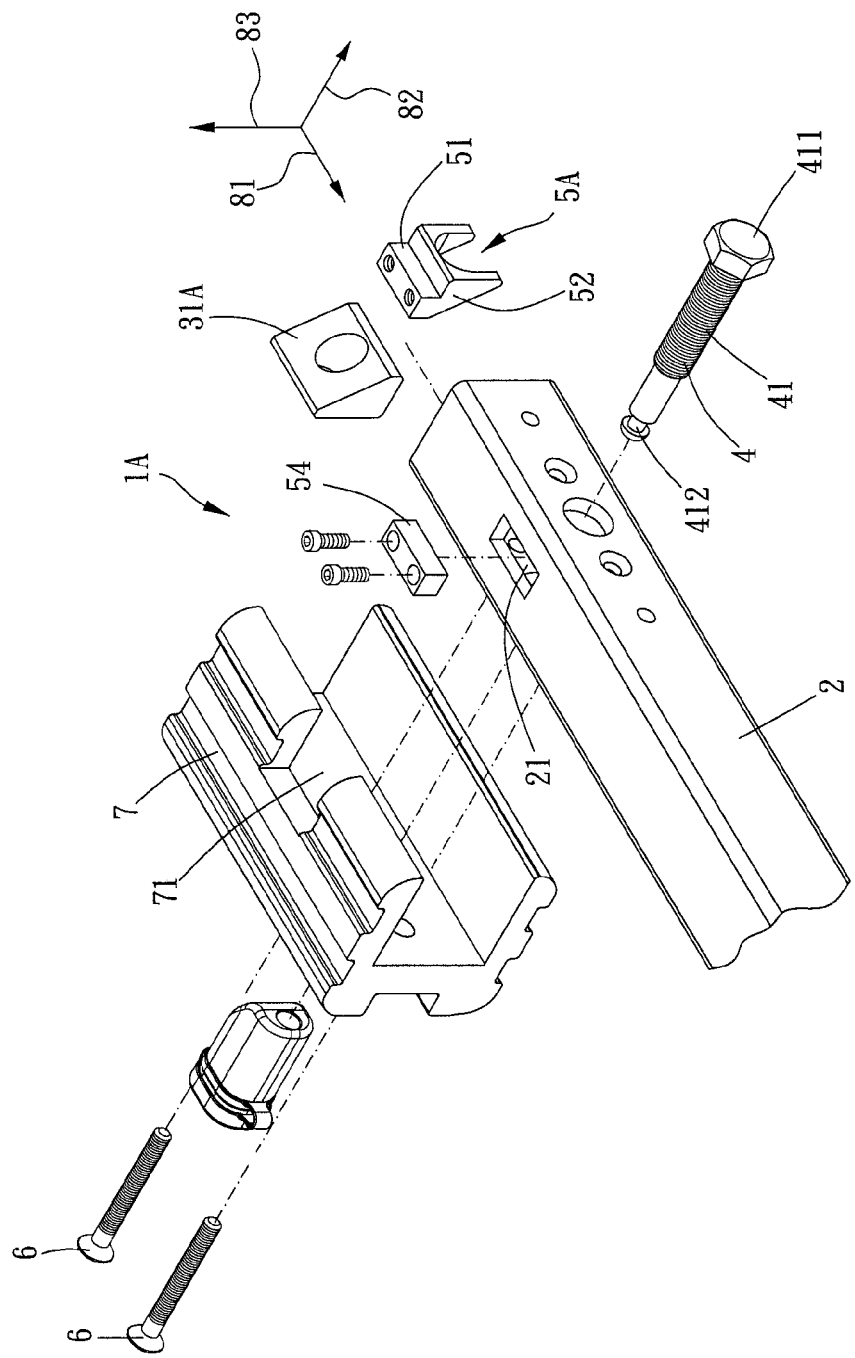
FIG. 9 is a breakdown view of another preferred embodiment of the present invention.

Please refer to FIGS. 8 to 11 for another embodiment of the present invention. A fastening structure 1A further includes a sleeve 7, the sleeve 7 is sleeved on the connection rod 2 and inserted in an assembling rod 91A, an abutting block 5A further includes a positioning block 54, and the positioning block 54 is disposed on the abutting portion 51. When a first abutted portion 31A pushes the second abutted portion 52, an abutting block 5A is forced to move along the third direction 83 to penetrate through the restriction hole 21, and the positioning block 54 abuts against the inner wall of the assembling rod 91 so as to eliminate a gap on the third direction 83 which is produce by the connection rod 2 inserted into the assembling rod 91A.

For example, a diagonal line of an assembling rod of a general automobile is 1.25 inches; therefore, when the present invention is assembled to the assembling rod 91A which has a 2-inch diagonal line, the sleeve 7 is sleeve on the connection rod 2 and inserted in the assembling rod 91A, and the abutting portion 51 has a positioning block 54 which abuts against the inner wall of the assembling rod 91A; therefore, there is no need to change the connection rods in different dimensions. A user only needs to assemble the sleeve 7 and the positioning block 54, and the fastening structure 1A can be assembled to the assembling rod 91A and eliminate a gap on the third direction 83 which is produce by the connection rod 2 inserted into the assembling rod 91A.

More specifically, as viewed along the first direction 81, the sleeve 7 is substantially C-shaped, the sleeve 7 has a reversed U-shaped notch 71, and the reversed U-shaped notch 71 corresponds to the restriction hole 21 so as to make the positioning block 54 abut against the inner wall of the assembling rod 91A smoothly so as to fasten the connection rod 2 and the assembling rod 91A tightly.

Given the above, the adjusting member can not only fix the slidable member to the connection rod on the second direction but also make the abutting block abut against the assembling rod of the automobile on the third direction, and the connection rod and the assembling rod abut against each other tightly in two directions; therefore, the connection rod and the assembling rod can be prevented from shaking, the adjusting member can be prevented from loosening off and being disassembled from the connection rod, and the connection rod and the assembling rod can be prevented from disassembled from each other.

While we have shown and described various embodiments in accordance with the present invention, it should be clear to those skilled in the art that further embodiments may be made without departing from the scope of the present invention.

What is claimed is:

1. A fastening structure for bicycle rack, for being connected to and fastened on an assembling rod of an automobile, including:
   a connection rod, inserted into the assembling rod of the automobile, the connection rod defining a first direction along a longitudinal direction thereof, a second direction being defined to be perpendicular to the first direction, a third direction being defined to be perpendicular to the first and second directions, the connection rod including a restriction hole along the third direction;
   a slidable member, slidably arranged in the connection rod, the slidable member having a first abutted portion;
   an adjusting member, disposed through the assembling rod of the automobile and the connection rod along the second direction, the adjusting member assembled to the slidable member in the connection rod, the slidable member being slidable between a first position and a second position along the second direction;
   an abutting block, arranged in the connection rod, the abutting block having an abutting portion and a second abutted portion, the first abutted portion abutting against the second abutted portion;
   at least one guiding rod, the at least one guiding rod being connected to the connection rod along the second direction and arranged within the slidable member;
   wherein when the adjusting member is driven, the adjusting member drives the slidable member to slide from the first position toward the second position, the first abutted portion pushes the second abutted portion, the abutting block is forced to move along the third direction to penetrate through the restriction hole and abut against an inner wall of the assembling rod so as to eliminate a gap on the third direction which is produced by the connection rod inserted into the assembling rod of the automobile.

2. The fastening structure for bicycle rack of claim 1, wherein at least one of the first and second abutted portions is a slant face inclined toward the third direction.

3. The fastening structure for bicycle rack of claim 1, wherein the abutting portion is a protrusion extending from the abutting block, and the restriction hole and the protrusion are complementary to each other in shape.

4. The fastening structure for bicycle rack of claim 1, wherein the first abutted portion is a first slant face inclined toward the third direction, the fastening structure includes two said guiding rods, each of two ends of the slidable member on the first direction includes a first side wall, the first slant face is located between the two first side walls, and the two guiding rods are respectively disposed through the two first side walls.

5. The fastening structure for bicycle rack of claim 4, wherein the abutting block is received in the two first side walls, each of two ends of the abutting block on the first direction includes a second side wall, the two second side walls form the second abutted portion, the second abutted portion are a second slant face inclined toward the third direction, as viewed along the second direction, the abutting block is reversed U-shaped, the abutting block is saddled on the adjusting member which is located between the two second side walls, the adjusting member is a threaded rod, the threaded rod is rotatable relative to the connection rod and the assembling rod, the threaded rod is screwed with the slidable member, an end of the threaded rod includes a head portion, the other end of the threaded rod radially includes a annular groove, a lock member is engaged with the annular groove, and through the head portion of the threaded rod and the lock member, the threaded rod is rotatably positioned in the connection rod.

6. The fastening structure for bicycle rack of claim 1, further including a sleeve, the sleeve sleeved on the connection rod and inserted in the assembling rod, the abutting block further including a positioning block, the positioning block being disposed on the abutting portion, when the first abutted portion pushes the second abutted portion, the abutting block is forced to move along the third direction to penetrate through the restriction hole, and the positioning block abuts against the inner wall of the assembling rod.

7. The fastening structure for bicycle rack of claim 6, wherein as viewed along the first direction, the sleeve is substantially C-shaped, the sleeve has a reversed U-shaped notch, and the reversed U-shaped notch corresponds to the restriction hole.

8. A fastening structure for bicycle rack, for being connected to and fastened on an assembling rod of an automobile, including:
   a connection rod, inserted into the assembling rod of the automobile, the connection rod defining a first direction along a longitudinal direction thereof, a second direction being defined to be perpendicular to the first direction, a third direction being defined to be perpendicular to the first and second directions the connection rod including a restriction hole along the third direction;
   a slidable member, slidably arranged in the connection rod, the slidable member having a first abutted portion;
   an adjusting member, disposed through the assembling rod of the automobile and the connection rod along the second direction, the adjusting member assembled to the slidable member in the connection rod, the slidable member being slidable between a first position and a second position along the second direction;
   an abutting block, arranged in the connection rod, the abutting block having an abutting portion and a second abutted portion, the first abutted portion abutting against the second abutted portion;
   wherein when the adjusting member is driven, the adjusting member drives the slidable member to slide from the first position toward the second position, the first abutted portion pushes the second abutted portion, the abutting block is forced to move along the third direction to penetrate through the restriction hole and abut against an inner wall of the assembling rod so as to eliminate a gap on the third direction which is produced by the connection rod inserted into the assembling rod of the automobile;
   wherein the adjusting member is a threaded rod, the threaded rod is rotatable relative to the connection rod and the assembling rod, and the threaded rod is screwed with the slidable member;
   wherein an end of the threaded rod is a head portion and the other end of the threaded rod radially includes a annular groove, a lock member is engaged within the annular groove, and the threaded rod is rotatably positioned in the connection rod through the head portion of the threaded rod and the lock member.

9. A fastening structure for bicycle rack, for being connected to and fastened on an assembling rod of an automobile, including:
   a connection rod, inserted into the assembling rod of the automobile, the connection rod defining a first direction along a longitudinal direction thereof, a second direction being defined to be perpendicular to the first direction, a third direction being defined to be perpendicular to the first and second directions, the connection rod including a restriction hole along the third direction;

a slidable member, slidably arranged in the connection rod, the slidable member having a first abutted portion;

an adjusting member, disposed through the assembling rod of the automobile and the connection rod along the second direction, the adjusting member assembled to the slidable member in the connection rod, the slidable member being slidable between a first position and a second position along the second direction;

an abutting block, arranged in the connection rod, the abutting block having an abutting portion and a second abutted portion, the first abutted portion abutting against the second abutted portion;

wherein when the adjusting member is driven, the adjusting member drives the slidable member to slide from the first position toward the second position, the first abutted portion pushes the second abutted portion, the abutting block is forced to move along the third direction to penetrate through the restriction hole and abut against an inner wall of the assembling rod so as to eliminate a gap on the third direction which is produced by the connection rod inserted into the assembling rod of the automobile;

wherein each of two ends of the abutting block on the first direction includes a second side wall, and the two second side walls form the second abutted portion;

wherein the second abutted portion is a slant face inclined toward the third direction, as viewed along the second direction, the abutting block is reversed U-shaped, the abutting block is saddled on the adjusting member, and the adjusting member is located between the two second side walls.

* * * * *